UNITED STATES PATENT OFFICE.

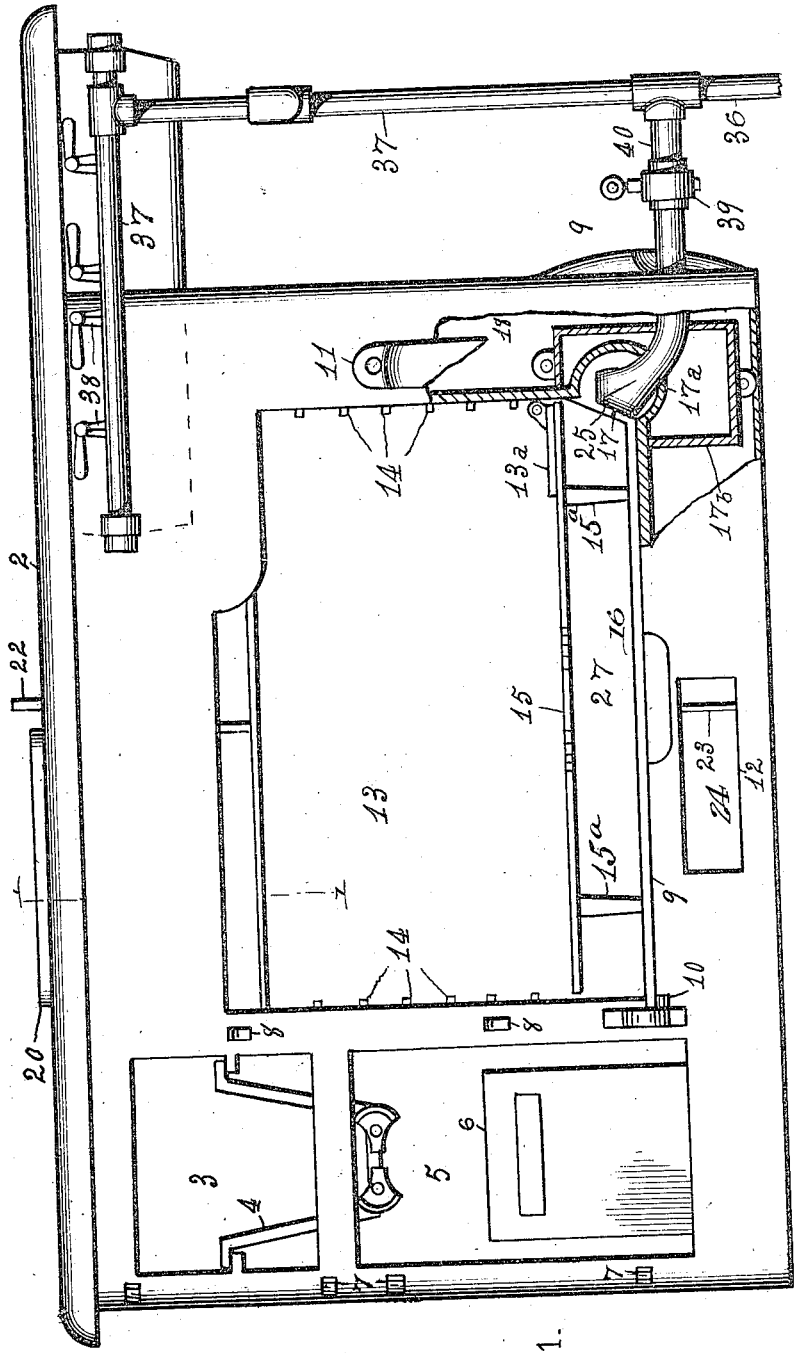
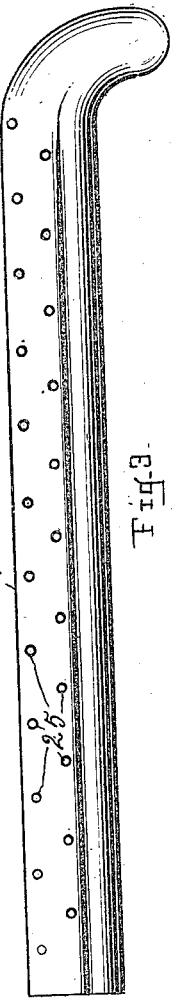
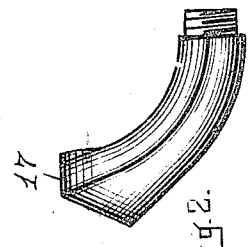

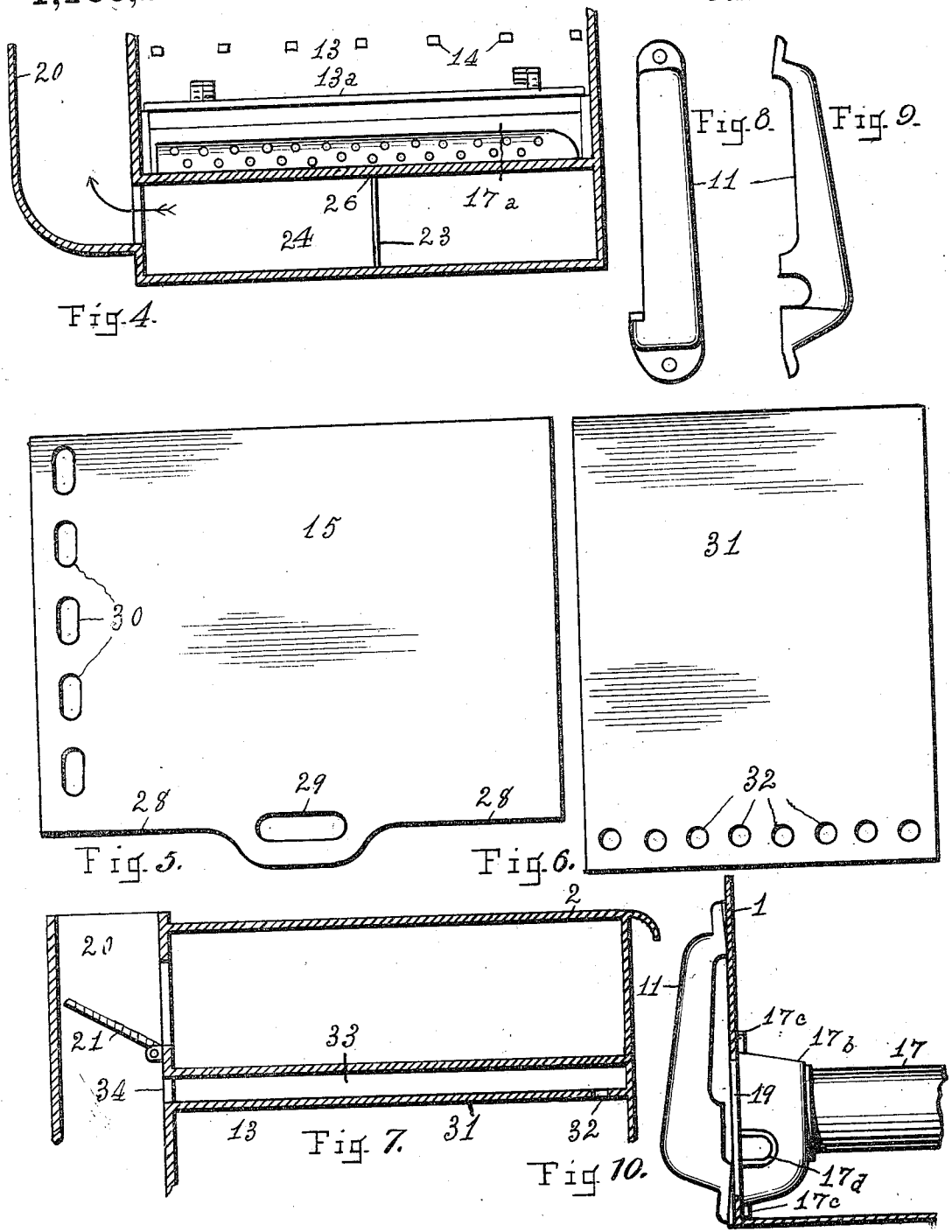

GEORGE O. BERGSTROM, OF NEENAH, WISCONSIN, ASSIGNOR TO BERGSTROM STOVE COMPANY, OF NEENAH, WISCONSIN.

STOVE OR RANGE.

1,160,245.  Specification of Letters Patent.  Patented Nov. 16, 1915.

Application filed May 17, 1915. Serial No. 28,633.

*To all whom it may concern:*

Be it known that I, GEORGE O. BERGSTROM, a citizen of the United States, residing at Neenah, in the county of Winnebago and State of Wisconsin, have invented a new and useful Stove or Range, of which the following is a specification.

My invention relates to a cooking stove or range in which solid fuel such as coal and wood and also gas is used, and includes the form of the gas burner for the oven and the location of said burner relative to the oven and the flues of the stove, and its object is to deliver the gas from such a point as not to affect the draft in the flues when solid fuel is being used, and to deliver such an abundant supply of air to the gas burner and provide such an arrangement of flues that when burning gas for heating the oven it will be uniformly heated and when burning solid fuel there will be no cold places in the oven by reason of the location therein of any of the gas heating mechanism. While cooking burners are shown in the drawings, it should be understood that they form no part of this invention.

My improvement is shown in the accompanying drawing in which,—

Figure 1 is a side elevation of a stove in which my invention is applied, the doors to the solid fuel fire pot and ash pan apartment being omitted and the oven door opened downward and showing the inside of the oven. Fig. 2 is an end elevation of the oven gas burner tube. Fig. 3 is a side elevation of said gas burner tube. Fig. 4 is an elevation in section, of a fragment of the inside of the oven at the right hand end of Fig. 1, and the gas burner in the flue at the end of the oven, the lid which closes an opening in the stove plate between the oven and said flue being opened. Fig. 5 is a plan of a removable gas oven plate which forms the oven bottom when it is heated with gas. Fig. 6 is a plan of a plate which forms a part of the oven top and the bottom of a flue which leads to the smoke pipe and is provided with flues in communication with the gas heated oven. Fig. 7 is a vertical section upon the line 1, 1, of Fig. 1, showing the space between the oven top and stove top and between the normal oven top and gas heated oven top. Figs. 8 and 9 are a plan and edge view respectively of the right hand oven hinge and flue opening cover. Fig. 10 is a vertical section of the opening into the gas burner tube pocket, a side elevation of a hinge member over the opening and an air receiving case around the pocket.

Similar numerals and letters indicate like parts in the several views.

1, indicates the front side of the stove; 2, the stove top; 3, the solid fuel opening; 4, the fire pot; 5, ash pan opening; 6, ash pan; 7, hinge members for doors; 8, door catches; 9, oven door opening downward; 10, left hand oven door hinge; 11, right hand oven door hinge member and cover for an opening through the plate 1 for admitting air to the gas burner for the oven; 12, clean out under the oven; 13, the oven having a bottom 26; 14, brackets for supporting shelves from the oven side walls; 15, a removable gas oven bottom plate supported upon legs 15ª, upon the normal oven bottom 16; 17, a gas burner tube which is located in a pocket 17ª, at the lower right hand corner of the oven, substantially outside of the oven walls, and is provided with a casing 17ᵇ, two or three inches in depth from the front plate 1, and within the down flue 18 at the point where the pipe that delivers the gas to the oven burner enters the stove. The burner tube 17, does not fill the opening from the pocket 17ª, into the oven, and air from outside of the stove can enter for supplying the burning gas. See Figs. 1 and 11.

19 is an air entrance through the plate 1, and under the hinge member 11 said member being spaced from the plate 1, intermediate its ends for permitting the entrance of outside air to the oven burner. The course of the draft from the fire pot when solid fuel is being used, with direct draft, is over the oven top to the smoke pipe 20, where a damper 21, having an operating handle 22, can cut off the direct draft. The indirect draft is across the oven top to the flue 18, thence downward and under the oven to a partition 23, (see Figs. 1 and 4) which extends from under the rear of the oven toward its front a part of the distance, around the end of which a flue 24, carries the draft to the smoke pipe. This arrangement of flues is common in wood and coal burning stoves. For the gas heated oven I place a burner tube 17 in the pocket 17ª, with its gas escape perforations 25, in communication with the lower end of the normal oven 13, the tube extending nearly across the end as is shown in Fig. 4.

13ª, is a lid hinged over the pocket for closing the same. Above the normal oven bottom 26, the plate 15 provides a gas burning chamber 27. The form of the plate 15 leaves a flue 28, at each side of the handle 29, and flues 30, are provided at the end of the plate opposite the burner end, whereby, with the flow of gas toward the flues 30, said plate is heated from the burning gas and the draft through the flues 28 allows the heat to pass upward inside of the oven door and counteract any cold air effects through the several joints around the oven door. Above the plate 15 is a plate 31, having a plurality of flues 32, through the front end thereof, through which the hot air passes to a flue 33, which extends from the front to rear ends of the oven and is in communication with the smoke pipe through the opening 34, at the rear end of the flue 33, so that by reason of the location of the burner tube 17, flues 28, 30, 32 and 33, and the opening 34, there is an even distribution of heat throughout the gas heated oven, and no cold air places remain around the oven by reason of the location of its burner, when the oven burner is not in use and the oven is being heated with fuel in the fire pot. A cock 39 is provided in the pipe 40, for controlling the supply of gas to the oven. The pocket case 17ᵇ, is attached to the frame plate 1, by means of bolts through its ears 17ᶜ. 17ᵈ, is an opening in the case through which the gas pipe 40 enters.

Having described my invention, what I claim and desire to secure by Letters Patent, is,—

1. In a combined solid fuel and gas burning stove having an oven adapted to be heated by the burning of solid fuel, a pocket substantially outside of the oven and at the lower right hand corner thereof and extending the full depth of the oven, a lid for closing over said pocket, a gas burner tube arranged therein and extending the entire length of the pocket and having a series of gas jet openings directed toward the oven, a pocket case arranged at one end of said pocket and partly inclosing the same and being adapted to admit air from outside of the stove and supply the same to the burning gas.

2. In a combined solid fuel and gas burning stove having an oven adapted to be heated by the burning of solid fuel, a pocket substantially outside of, and at the lower right hand corner and extending the full depth of the oven, a lid for closing over said pocket, a gas burner tube arranged therein and extending the entire length of the pocket and having a series of gas jet openings directed toward the oven, an opening to the outside air from said pocket and into the oven for admitting a supply of air to the gas burner, a supplemental oven bottom plate spaced above the normal oven bottom and having an opening for a handle and a narrow space forming a flue at each side of the handle the full width of the oven door and a plurality of flues through the plate at the end thereof opposite the gas burner end which are in communication with the smoke pipe flue.

3. In a combined solid fuel and gas burning stove having an oven adapted to be heated by the burning of solid fuel, a pocket substantially outside of, and at the lower right hand corner and extending the full depth of the oven, a lid for closing over said pocket, a gas burner tube arranged therein and extending the entire length of the pocket and having a series of gas jet openings directed toward the oven, an opening to the outside air from said pocket and into the oven for admitting a supply of air to the gas burner, a supplemental oven bottom plate spaced above the normal oven bottom and having an opening for a handle and a narrow space forming a flue at each side of the handle the full width of the oven door and a plurality of flues through the plate at the end thereof opposite the gas burner end, a plate spaced from the oven top below said top and forming a flue between it and the oven top which leads to the smoke pipe flue and a plurality of apertures through the plate directly above the narrow spaced flues inside of the oven door along the front edge of the supplemental oven bottom.

4. In a combined solid fuel and gas burning stove having an oven therein adapted to be heated by the burning of solid fuel, a pocket at the lower right hand corner of the oven substantially outside of the oven, a lid for closing over said pocket, a gas burner tube arranged along said pocket substantially the full depth of the oven and having a series of gas jet openings directed toward the oven, a pocket case around the entrance to said pocket through which air can be admitted from outside of the stove for supplying air to the gas burners, in combination with a supplemental oven plate which forms a gas heated oven bottom, spaced above the normal oven bottom and having legs supported upon said normal bottom, a hand hole at the side of the plate adjoining the oven door, a flue each side of the hand hole, flues at the end of the plate opposite the burner tube end, a plate arranged above the supplemental oven bottom plate and forming a flue which leads to the smoke pipe, and a series of flues through said plate at its end adjoining the oven door.

GEORGE O. BERGSTROM.

Witnesses:
JOHN W. POWERS,
WM. A. GERHARDT.